United States Patent
Wang et al.

(10) Patent No.: US 9,732,617 B2
(45) Date of Patent: Aug. 15, 2017

(54) COOLED AIRFOIL TRAILING EDGE AND METHOD OF COOLING THE AIRFOIL TRAILING EDGE

(71) Applicant: General Electric Company, Schenectady, NY (US)

(72) Inventors: Guanghua Wang, Clifton Park, NY (US); Ronald Scott Bunker, West Chester, OH (US); Jeremy Clyde Bailey, Middle Grove, NY (US); James Peter DeLancey, Corinth, NY (US); David Benjamin Helmer, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 602 days.

(21) Appl. No.: 14/089,920

(22) Filed: Nov. 26, 2013

(65) Prior Publication Data
US 2015/0147158 A1    May 28, 2015

(51) Int. Cl.
*F01D 5/18* (2006.01)
*F01D 9/04* (2006.01)
*F01D 9/06* (2006.01)

(52) U.S. Cl.
CPC ............. *F01D 5/186* (2013.01); *F01D 5/187* (2013.01); *F01D 9/041* (2013.01); *F01D 9/065* (2013.01);
(Continued)

(58) Field of Classification Search
CPC ................................. F01D 5/186; F01D 5/187
See application file for complete search history.

(56) References Cited

U.S. PATENT DOCUMENTS 3,885,609 A * 5/1975 Frei .................. F01D 5/187
                                                      415/115
4,303,374 A * 12/1981 Braddy .............. F01D 5/186
                                                      415/115
(Continued)

FOREIGN PATENT DOCUMENTS

CN       1987053 A      6/2007
EP       1561901 A2     8/2005
(Continued)

OTHER PUBLICATIONS

PCT Search Report and Written Opinion issued in connection with corresponding PCT Application No. PCT/US2014/066850 on Oct. 5, 2015.
(Continued)

*Primary Examiner* — Gregory Anderson
*Assistant Examiner* — Jason Fountain
(74) *Attorney, Agent, or Firm* — Nitin N. Joshi

(57) ABSTRACT

An airfoil and method of cooling a airfoil including a leading edge, a trailing edge, a suction side, a pressure side and at least one internal cooling channel configured to convey a cooling fluid, is provided. A plurality of trailing edge bleed slots are in fluid communication with the at least one internal cooling channel, wherein a downstream edge of the pressure side of the airfoil lies upstream of a downstream edge of the suction side to expose the plurality of trailing edge bleed slots proximate to the trailing edge of the airfoil. The at least one internal cooling channel is configured to supply the cooling fluid from a source of cooling fluid towards the plurality of trailing edge bleed slots. A plurality of obstruction features are disposed within the at least one internal cooling channel and at a downstream edge of the remaining pressure side. The one or more obstruction features are configured having a predefined substantially polygon shape,
(Continued)

to distribute a flow of the cooling fluid and provide distributed cooling to the plurality of trailing edge bleed slots.

20 Claims, 8 Drawing Sheets

(52) U.S. Cl.
CPC .... *F05D 2240/304* (2013.01); *F05D 2250/13* (2013.01); *F05D 2250/131* (2013.01); *F05D 2250/14* (2013.01); *F05D 2250/141* (2013.01); *F05D 2250/324* (2013.01); *F05D 2260/2212* (2013.01); *Y02T 50/673* (2013.01); *Y02T 50/676* (2013.01)

(56) References Cited

U.S. PATENT DOCUMENTS

| | | | |
|---|---|---|---|
| 6,224,336 B1 | 5/2001 | Kercher | |
| 6,234,754 B1 | 5/2001 | Zelesky et al. | |
| 6,616,406 B2 * | 9/2003 | Liang | F01D 5/186 416/97 R |
| 7,575,414 B2 * | 8/2009 | Lee | F01D 5/186 415/115 |
| 7,766,616 B2 * | 8/2010 | Baldauf | F01D 5/187 416/1 |
| 9,017,026 B2 * | 4/2015 | Bergholz, Jr. | F01D 5/186 416/97 R |
| 9,039,371 B2 * | 5/2015 | Lee | F01D 5/187 416/97 R |
| 9,145,773 B2 * | 9/2015 | Bergholz, Jr. | F01D 5/187 |
| 2005/0135933 A1 | 6/2005 | Gregg et al. | |
| 2007/0140850 A1 | 6/2007 | Pang et al. | |
| 2010/0183446 A1 | 7/2010 | Ammann et al. | |
| 2010/0221123 A1 | 9/2010 | Pal et al. | |
| 2011/0085915 A1 | 4/2011 | Krueckels et al. | |
| 2011/0268583 A1 | 11/2011 | Bunker | |
| 2012/0076654 A1 | 3/2012 | Maldonado et al. | |
| 2013/0052036 A1 | 2/2013 | Smith | |
| 2013/0177446 A1 | 7/2013 | Smith et al. | |
| 2013/0232991 A1 | 9/2013 | Otero | |
| 2013/0259645 A1 | 10/2013 | Bergholz, Jr. et al. | |
| 2013/0259705 A1 | 10/2013 | Bergholz, Jr. et al. | |
| 2013/0302176 A1 | 11/2013 | Bergholz, Jr. et al. | |
| 2013/0302177 A1 | 11/2013 | Bergholz, Jr. et al. | |
| 2013/0302178 A1 | 11/2013 | Bergholz, Jr. et al. | |
| 2013/0302179 A1 | 11/2013 | Bergholz, Jr. et al. | |

FOREIGN PATENT DOCUMENTS

| | | |
|---|---|---|
| EP | 1645722 A2 | 4/2006 |
| EP | 1707741 A2 | 10/2006 |
| EP | 2530244 A2 | 12/2010 |
| EP | 2568119 A2 | 3/2013 |
| JP | 01159138 U | 11/1989 |
| JP | 2001098904 A | 4/2001 |
| JP | 2002188406 A | 7/2002 |
| JP | 2005201253 A | 7/2005 |
| JP | 2011513636 A | 4/2011 |

OTHER PUBLICATIONS

Unofficial English translation of Office Action and Search Report issued in connection with corresponding CN Application No. 201480064690.5 on Oct. 31, 2016.

Unofficial English Translation of Japanese Search Report issued in connection with corresponding JP Application No. 2016-534137 on Apr. 5, 2017.

Japanese Office Action issued in connection with corresponding JP Application No. 2016-534137 on Apr. 25, 2017.

* cited by examiner

COOLED AIRFOIL TRAILING EDGE AND METHOD OF COOLING THE AIRFOIL TRAILING EDGE

BACKGROUND

The present disclosure relates generally to an airfoil trailing edge, and more particularly, to a cooled turbine airfoil trailing edge.

Commonly, in a non-limiting example a cooled airfoil turbine includes a leading edge and a trailing edge. Hot fluids on an exterior airfoil surface of the turbine, combined with aggressive high fluid velocities at the trailing edge, lead to high heat fluxes when the material temperatures are limited to reasonable values. The heating of the trailing edge leads to deterioration and shorter life of the trailing edge. Different approaches have been employed in the past to reduce the heating of the trailing edge. A typical example of one such approach is to increase a thickness of the trailing edge, thereby allowing internal cooling of the trailing edge to reduce the deterioration of the trailing edge due to the applied heat flux. However, it is generally known that the thickness of the trailing edge is inversely proportional to the aerodynamic efficiency of the airfoil. Therefore, increasing the thickness of the trailing edge adversely affects the efficiency of the airfoil. In contrast, reducing the thickness of the trailing edge may result in rapid deterioration of the trailing edge if sufficiently effective cooling means are absent.

Some airfoils employ a cooling system to provide cooling to the trailing edge. One such approach is airfoil pressure side bleed slots where an aft portion of the airfoil pressure side is formed as a series of slots with intermediate lands during formation of the airfoil via a casting process. The bleed slots are connected to internal cooling channels and provide for a flow of a cooling fluid at the trailing edge. The cooling fluid reduces the temperature of the heated trailing edge. However, the cooling effectiveness typically decreases beyond the point of good durability as a result of inlet effects. More specifically, radial feeding of the cooling flow may induce flow distortion or separation in the trailing edge coolant flow that leads to low film effectiveness and resultant high metal temperature. This results in undesirable costs and inefficiency of the airfoil as well as a short part lifing. Therefore, obtaining sufficient cooling over the trailing edge remains a challenge.

In addition, the amount of cooling air used to cool the trailing edge is of issue. In many designs, the cooling flow rate in the trailing edge is greater than required to achieve effective cooling, but constrained by the manufacturing and the dimensions that can actually be achieved. Therefore, an improvement that allows for the use of less cooling flow, yet manufacturable, will lead to a more efficient engine.

It would therefore be desirable to provide a novel cooled airfoil to address the aforementioned issues.

BRIEF DESCRIPTION

These and other shortcomings of the prior art are addressed by the present disclosure, which provides cooled airfoil trailing edge and method of cooling the airfoil trailing edge.

One aspect of the present disclosure resides in an airfoil comprising: a leading edge; a trailing edge; a suction side, a pressure side, a suction side, a pressure side, at least one internal cooling channel defined between the pressure side and the suction side of the airfoil and configured to convey a cooling fluid; a plurality of trailing edge bleed slots in fluid communication with the at least one internal cooling channel; and one or more obstruction features disposed within the at least one internal cooling channel and at a downstream edge of the remaining pressure side. A downstream edge of the pressure side of the airfoil lies upstream of a downstream edge of the suction side to expose the plurality of trailing edge bleed slots proximate to the trailing edge of the airfoil. The at least one cooling channel is configured to supply the cooling fluid towards the plurality of trailing edge bleed slots. The one or more obstruction features are configured to distribute a flow of the cooling fluid and provide distributed cooling to the plurality of trailing edge bleed slots.

Another aspect of the present disclosure resides in an airfoil comprising: a leading edge; a trailing edge; a suction side, a pressure side, at least one internal cooling channel defined between the pressure side and the suction side of the airfoil and configured to convey a cooling fluid; a plurality of trailing edge bleed slots in fluid communication with the at least one internal cooling channel; a pin array positioned within the at least one internal cooling channel to distribute the flow of the cooling fluid towards the trailing edge; and one or more obstruction features disposed within the at least one internal cooling channel at a downstream edge of the remaining pressure side. A downstream edge of the pressure side of the airfoil lies upstream of a downstream edge of the suction side to expose the plurality of trailing edge bleed slots proximate to the trailing edge of the airfoil. The at least one cooling channel is configured to supply the cooling fluid from a source of cooling fluid towards the plurality of trailing edge bleed slots. The one or more obstruction features comprising a predefined substantially polygon shape and configured to distribute a flow of the cooling fluid and provide distributed cooling to the plurality of trailing edge bleed slots.

Yet another aspect of the disclosure resides in a method of cooling a airfoil comprising a leading edge, a trailing edge, a suction side, a pressure side, at least one internal cooling channel configured to convey a cooling fluid. The method comprising: supplying the cooling fluid from the at least one internal cooling channel toward a plurality of trailing edge bleed slots in fluid communication with the at least one internal cooling channels; and distributing the flow of the cooling fluid via the plurality of obstruction features to form a channeled film of the cooling fluid on the trailing edge bleed slots for cooling the trailing edge via the plurality of obstruction features. A wherein a downstream edge of the pressure side of the airfoil lies upstream of a downstream edge of the suction side to expose the plurality of trailing edge bleed slots proximate to the trailing edge of the airfoil. The at least one internal cooling channel includes a plurality of obstruction features disposed within the at least one internal cooling channel at a downstream edge of the remaining pressure side, the plurality of obstruction features configured to distribute a flow of the cooling fluid.

Various refinements of the features noted above exist in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

BRIEF DESCRIPTION OF THE DRAWINGS

The above and other features, aspects, and advantages of the present disclosure will become better understood when the following detailed description is read with reference to the accompanying drawings in which like characters represent like parts throughout the drawings, wherein.

DETAILED DESCRIPTION

Figure 1:
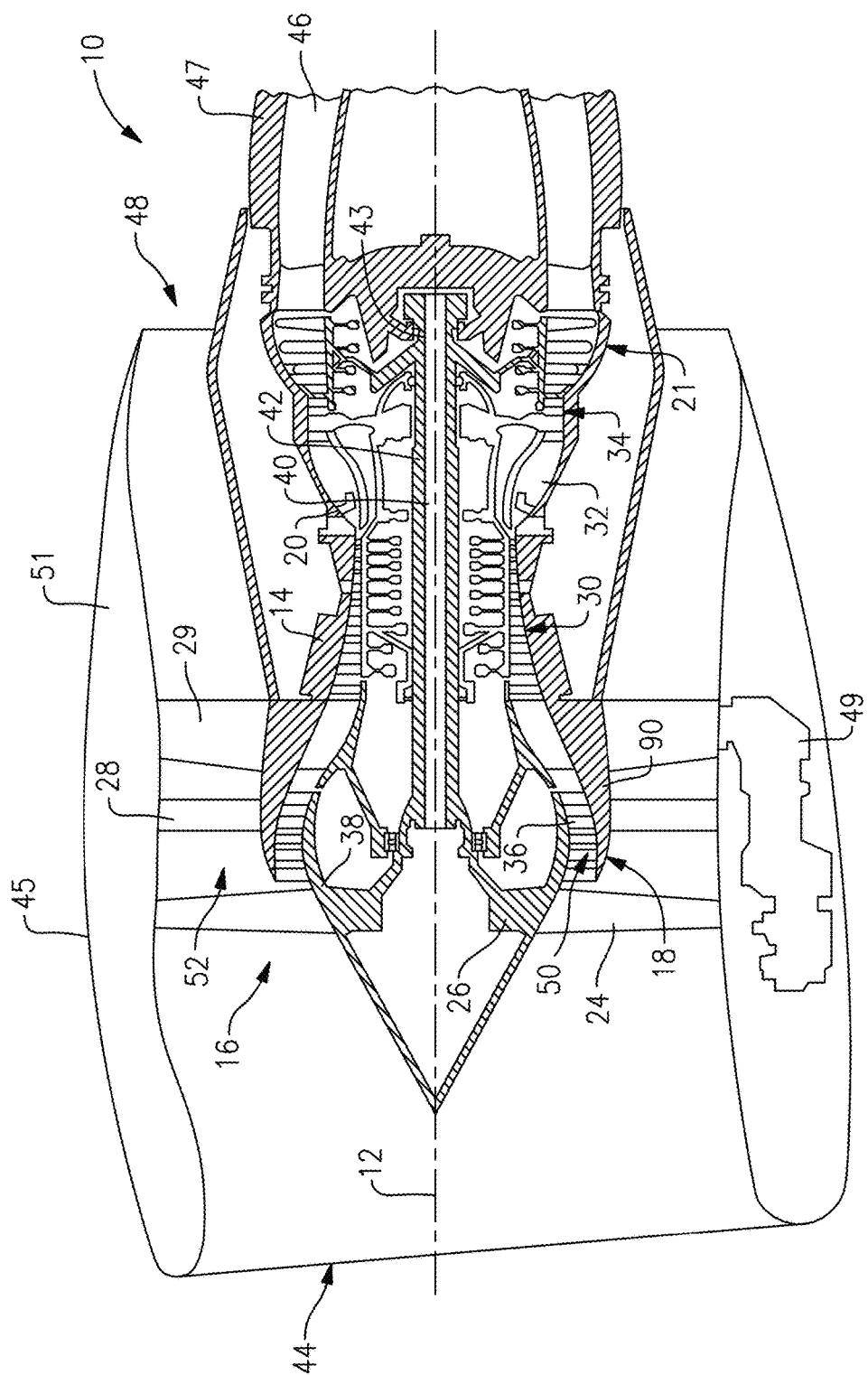
FIG. 1 is a schematic representation of a conventional turbine engine incorporating a cooled airfoil trailing edge and method of cooling the airfoil trailing edge in accordance with one or more embodiments shown or described herein.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Further, each example or embodiment is provided to facilitate explanation of certain aspects of the disclosure and should not be interpreted as limiting the scope of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure is generally directed to turbine components, particularly hot gas path components, formed with cooling features, such as to facilitate cooling of the respective components. In particular, aspects of the present disclosure are directed to cooling the trailing edge of a hot gas path component for use in a turbine. With this in mind, the following discussion provides a general overview of a representative turbine system in which such a hot gas path component including a cooled trailing edge may be employed as well as a discussion of the configuration of the cooled trailing edge in suitable components of such a turbine system and method of cooling.

As discussed in detail below, embodiments of the present disclosure include an airfoil and a method for cooling the airfoil. The airfoil includes at least one internal cooling channel having an exposed portion proximate to a trailing edge of the airfoil defining a plurality of bleed slots. A downstream edge of the pressure side of the airfoil lies upstream of a downstream edge of the suction side to expose the plurality of trailing edge bleed slots proximate to the trailing edge of the airfoil. The bleed slots have further disposed at an upstream ends, a plurality of obstruction features for the distribution of an impinging cooling flow.

Generally, a hot fluid on an exterior airfoil surface of the airfoil, combined with aggressive high fluid velocities at the trailing edge, leads to high heat fluxes when the material temperatures are limited to reasonable values. Higher material temperatures of the trailing edge lead to a deterioration and higher maintenance cost of the airfoil. Airfoil trailing edge cooling accomplished by a cooling flow is standard in the industry. With known trailing edge cooling channel designs, radial feeding may induce flow distortion or separation in the trailing edge coolant flow, which leads to low film effectiveness and shortened part lifing. Therefore, a novel airfoil providing features for cooling the trailing edge by reducing flow distortion or separation induced by this radial feeding and a method of cooling the airfoil are described below with reference to FIG. 1-8.

Referring to the drawings wherein identical reference numerals denote the same elements throughout the various views, FIG. 1 depicts a schematic illustration of an exemplary aircraft engine assembly 10 in accordance with the present disclosure. The engine assembly 10 has a longitudinal center line or axis 12 and an outer stationary annular casing 14 disposed concentrically about and coaxially along the axis 12. In the exemplary embodiment, the engine assembly 10 includes, in serial flow communication, a fan assembly 16, a booster compressor 18, a core gas turbine engine 20, and a low-pressure turbine 21 that may be coupled to the fan assembly 16 and the booster compressor 18. The fan assembly 16 includes a plurality of rotor fan blades 24 that extend substantially radially outward from a fan rotor disk 26, as well as a plurality of structural strut members 28 and outlet guide vanes ("OGVs") 29 that may be positioned downstream of the rotor fan blades 24. In this example, separate members are provided for the aerodynamic and structural functions. In other configurations, each of the OGVs 29 may be both an aero-turning element and a structural support for an annular fan casing (described presently).

The core gas turbine engine 20 includes a high-pressure compressor 30, a combustor 32, and a high-pressure turbine 34. The booster compressor 18 includes a plurality of rotor blades 36 that extend substantially radially outward from a compressor rotor disk 38 coupled to a first drive shaft 40. The high-pressure compressor 30 and the high-pressure turbine 34 are coupled together by a second drive shaft 42. The first and second drive shafts 40 and 42 are rotatably mounted in bearings 43 which are themselves mounted in a fan frame 45 and a turbine rear frame 47. The fan frame 45 has a central hub 49 connected to the annular fan casing 51. The engine assembly 10 also includes an intake side 44, a core engine exhaust side 46, and a fan exhaust side 48.

During operation, the fan assembly 16 compresses air entering the engine assembly 10 through the intake side 44. The airflow exiting the fan assembly 16 is split such that a portion 50 of the airflow is channeled into the booster compressor 18, as compressed airflow, and a remaining portion 52 of the airflow bypasses the booster compressor 18 and the core gas turbine engine 20 and exits the engine assembly 10 through the fan exhaust side 48 as bypass air. This bypass air portion 52 flows past and interacts with the structural strut members 28 and the outlet guide vanes 29. The plurality of rotor blades 24 compress and deliver the compressed airflow 50 towards the core gas turbine engine 20. Furthermore, the airflow 50 is further compressed by the high-pressure compressor 30 and is delivered to the combustor 32. The highly pressurized compressed air is mixed with fuel in the combustor 32 and ignited to generate hot highly pressurized propulsive gases, which gases flow further downstream and are utilized by high pressure turbine 34 to drive the high pressure compressor 30. The hot, highly pressurized propulsive gases expand and lose some of their energy and continue to flow further downstream.

Moreover, the compressed airflow 50 from the combustor 32 drives the rotating high-pressure turbine 34 and the low-pressure turbine 18 to drive the fan assembly 16 and the booster compressor 18. The hot, highly pressurized propulsive gases exit the engine assembly 10 through the core engine exhaust side 46.

Figure 2:
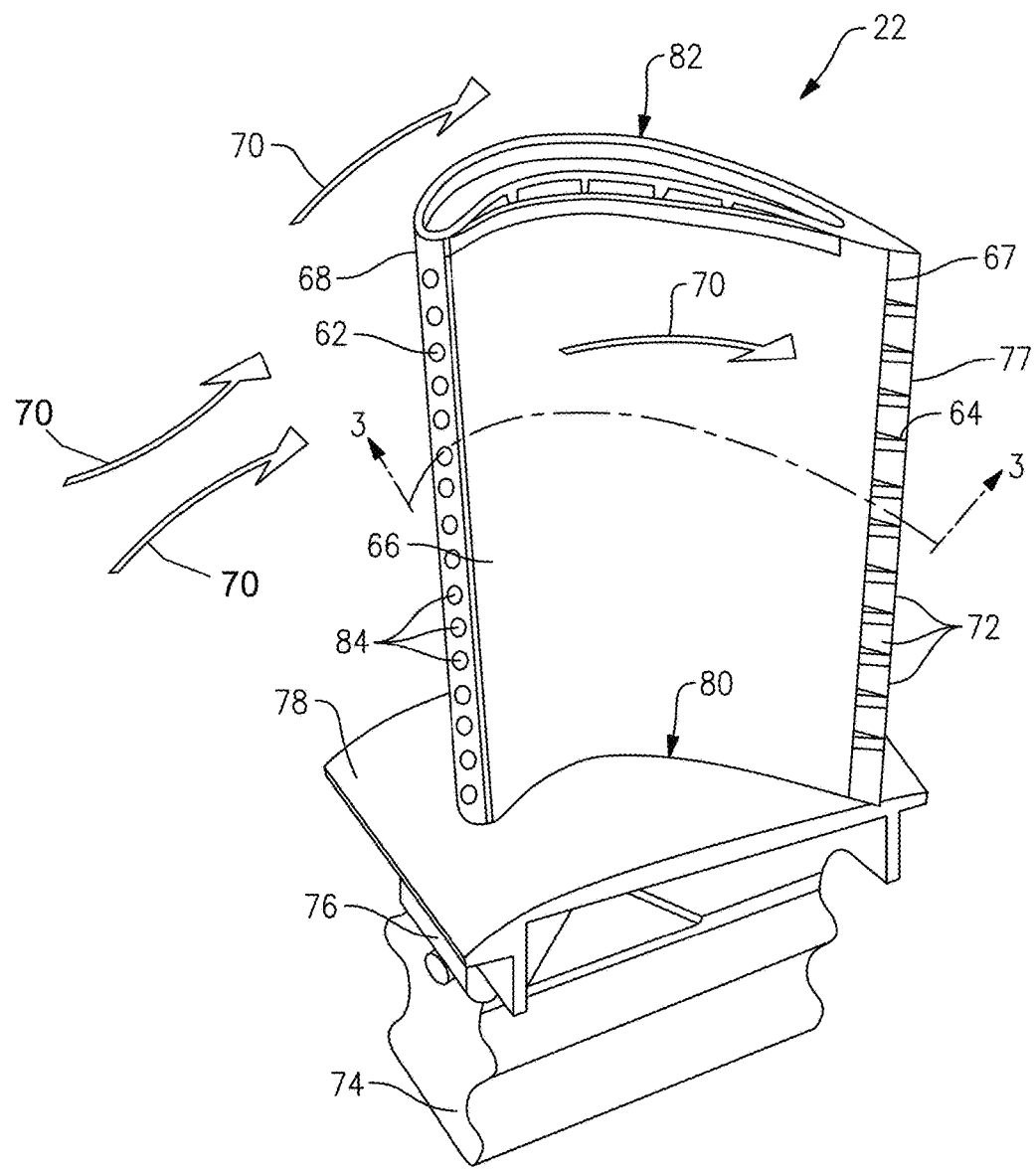
FIG. 2 is a schematic representation of the cooled airfoil of the high pressure turbine of FIG. 1 in accordance with one or more embodiments shown or described herein.

In an embodiment, the high pressure turbine 20 includes a plurality of airfoils 22 (FIG. 2). The airfoil 22 is described in greater detail with reference to FIG. 2. It should be noted herein that even though the airfoil 22 is discussed with reference to the turbine engine, the airfoil 22 is applicable to any other applications such as cooled vanes or nozzles in which heating of the trailing edge needs to be controlled are also envisaged. More particularly, while the concepts of the present disclosure will be described using the airfoil 22 as an example of a cooled apparatus, it will be understood that those concepts are applicable to any aero-turning or stationary airfoil-type structure within the engine assembly 10.

FIG. 2 is a schematic representation of the airfoil 22 of the high-pressure turbine 20 of FIG. 1. The airfoil 22 includes a leading edge 62 and a trailing edge 64 that provide a lift and direction to a flow of a fluid. It should be noted herein that a first edge of the airfoil 22 to contact the incoming gases is referred to as the leading edge 62 and a second edge that contacts the gas as the gas flows past the airfoil 22 is referred to as the trailing edge 64. In an embodiment of the disclosure, the airfoil 22 is formed via an investment casting process. In another embodiment, the airfoil 22 may include but not limited to blades, buckets, vanes and nozzles. In operation, the hot highly pressurized propulsive gases flow over the high-pressure turbine 20 (FIG. 1) and rotate the airfoil 22. A face of the airfoil 22 subjected to higher pressure is referred to as a pressure side 66 while a face subjected to a lower pressure is referred to as a suction side 68. The hot highly pressurized propulsive gases flow generally in a direction 70 from the leading edge 62 towards the trailing edge 64 over both sides of the airfoil. As the gases flow past the airfoil 22, the gases flow faster over a longer side than a shorter side. The faster moving gas stream has a lower pressure than a slower moving gas stream. This pressure difference creates a force in the direction of the suction side 68 of the airfoil 22. This force is referred to as a lift. The flow of the hot highly pressurized propulsive gases in the direction 70 results in heating of the trailing edge 64. The ability to cool the trailing edge 64 is directly related to the thickness, geometry, and manufacturing of the trailing edge 64. To aid in cooling the trailing edge 64, as illustrated, the pressure side 66 has been cast whereby a downstream edge 67 of the pressure side lies upstream of a downstream edge 77 of the suction side 68. In an exemplary embodiment, the pressure side 64 configured in such a way, results in about forty percent decrease in the trailing edge thickness of the trailing edge 64. In addition, at least one internal cooling channel (shown in subsequent FIGS. 3 and 4) is provided to reduce the temperature of the trailing edge 64. Furthermore, a plurality of trailing edge bleed slots 72, including one or more flow obstruction features (described presently) are formed at an end of each of the at least one cooling channel proximate to the trailing edge 64.

The airfoil 22 may include a conventional dovetail 74 attached to a conventional rotor disk. A blade shank 76 extends upwardly from the dovetail 74 and terminates in a platform 78 that projects outwardly from and surrounds the blade shank 76. The hollow airfoil 22 extends outwardly from the platform 78. The airfoil 22 has a root 80 at the junction with the platform 78 and a tip 82 at its outer end. The airfoil 22 may include a number of leading edge cooling holes 84. The airfoil 22 is described herein for purposes of example only. The airfoil 22 may have any size or shape suitable for extracting energy from the flow of combustion gases. Other components and other configurations may be used herein.

Figure 3:
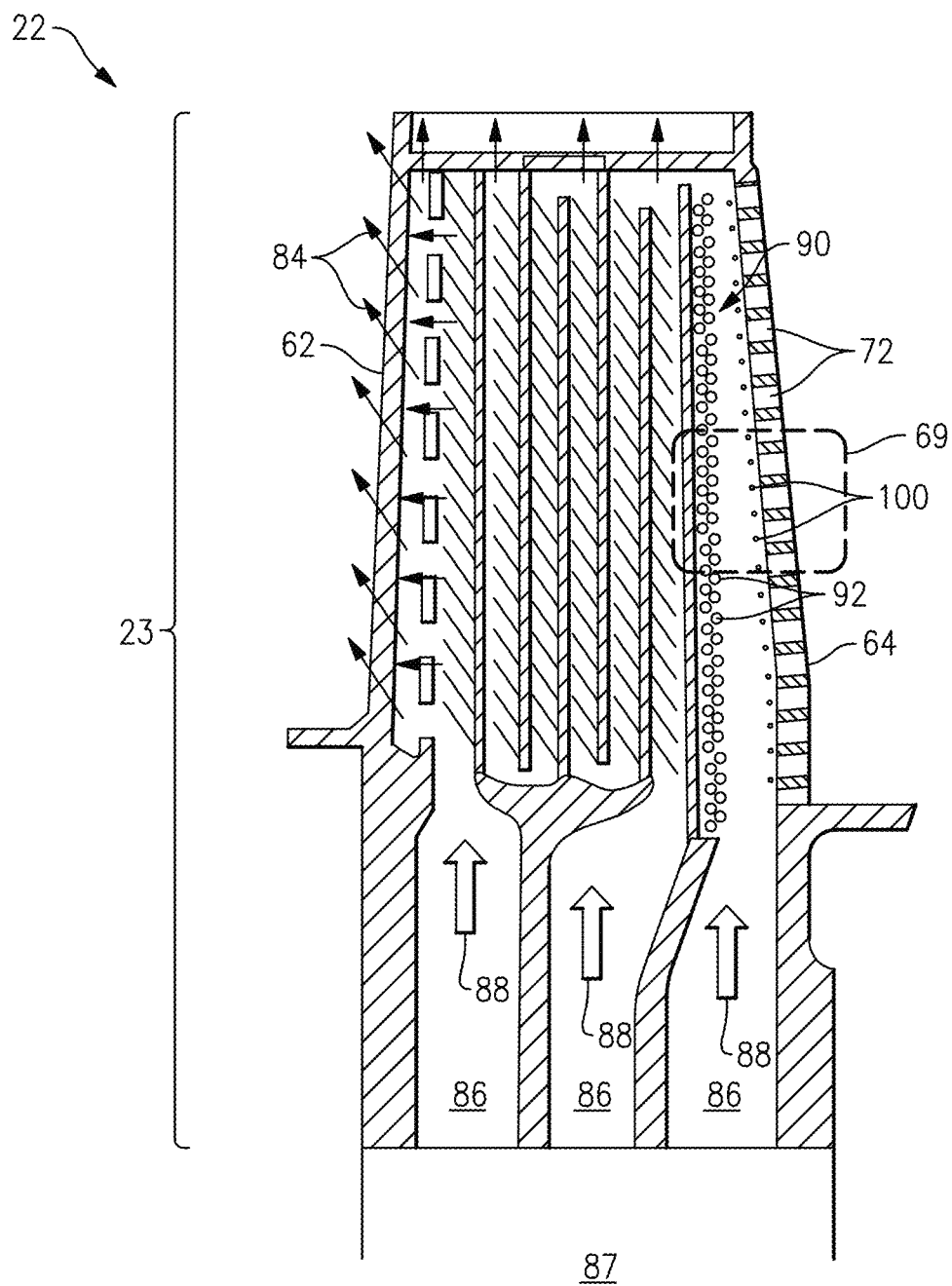
FIG. 3 is a schematic illustration of a cross sectional view of a trailing edge of the cooled airfoil of FIG. 2 depicting a plurality of obstruction features and a plurality of bleed slots in accordance with one or more embodiments shown or described herein.

FIG. 3 shows a side cross-sectional view of the airfoil 22 taken through line 3-3 of FIG. 2. Typically, a cooling system is provided in the airfoil 22 to cool the trailing edge 64 during operation. As is shown, the airfoil 22 includes at least one internal cooling channel 86, also commonly referred to as cavities, chambers, or the like, defined between the pressure side 66 and the suction side 68 (FIG. 2). In an embodiment, the airfoil 22 may include a number of internal cooling channels 86, of which a plurality are illustrated in FIG. 3. The at least one cooling channel 86 is disposed along a span 23 of the airfoil 22 to supply a cooling fluid 88 from a source of the cooling air 87, as fed by the engine cooling circuit, towards the trailing edge 64 of the airfoil 22 to reduce the temperature of the trailing edge 64. In an alternate embodiment, the at least one cooling channel 86 may be axially oriented, or in some other manner so as to supply the cooling fluid to the airfoil.

In an embodiment of the disclosure, the at least one internal cooling channel 86 is formed via an investment casting process, an electrical discharge machining, hereinafter referred to as "EDM", electrochemical machining, hereinafter referred to as "ECM", milling, or a combination thereof. In another embodiment, the at least one internal cooling channel 86 has a racetrack, elliptical or a circular cross section. The airfoil 22 may be air cooled, steam cooled, open circuit, or closed circuit. The leading edge cooling holes 84 may be in communication with one or more of the internal cooling channels 86. Likewise, the plurality of trailing edge bleed slots 72 may be in communication with one or more of the internal cooling channels 86. One or more of the internal cooling channels 86 may also include a pin array 90. The pin array 90 may be an array of pin-fins 92. The pin-fins 92 may have any desired size, shape, or configuration. In this example, the pin array 90 is positioned upstream of the trailing edge 64 and the plurality of trailing edge bleed slots 72. As previously alluded to, the airfoil 22 further includes one or more flow obstruction features 100 disposed downstream of the pin-array 90 and upstream of the plurality of trailing edge bleed slots 72. The one or more flow obstruction features 100 are disposed within the at least one internal cooling channel 86 and proximate a downstream edge 67 (FIG. 2) of the pressure side 66. The one or more flow obstruction features 100 provide improved cooling to the trailing edge 64, and in particular the plurality of trailing edge bleed slots 72, in effect decreasing the amount of required cooling flow without otherwise violating manufacture constraints of flow passages. The resultant decrease in the rate of required cooling flow needed to cool the trailing edge 64 results in improved specific fuel consumption (SFC), resulting in an increase in fuel efficiency.

Figure 4:
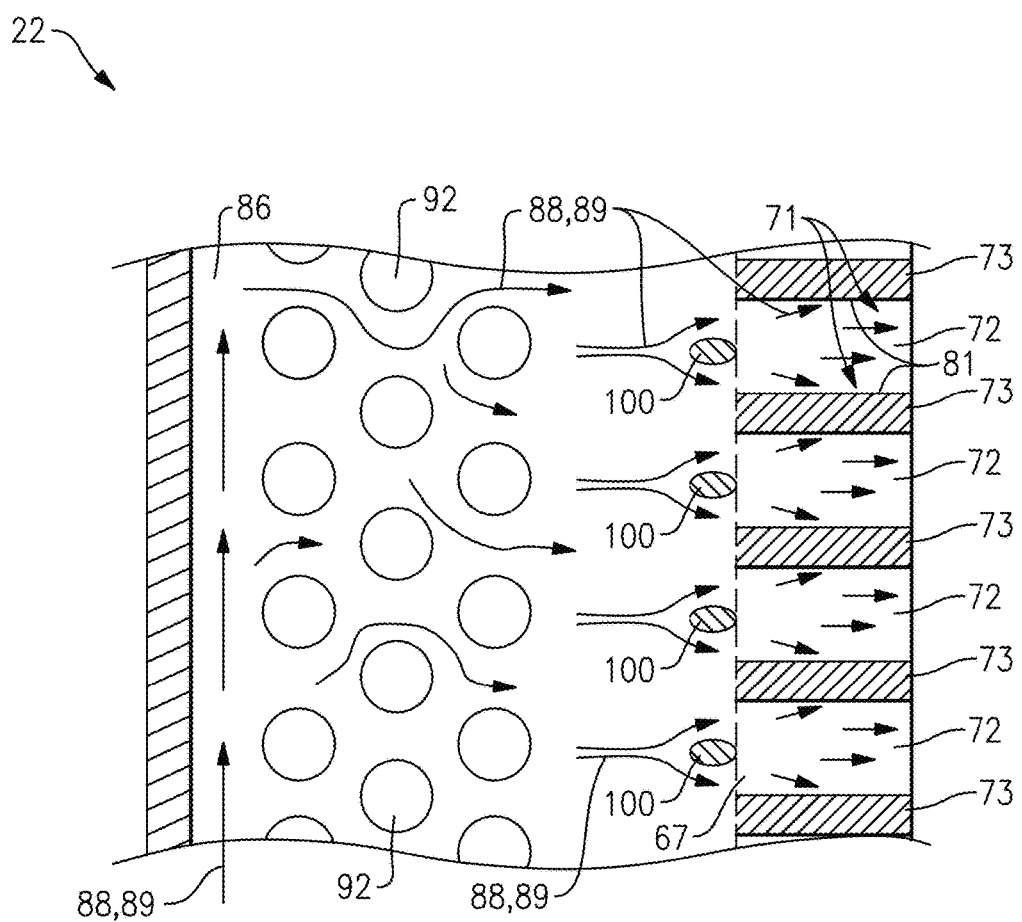
FIG. 4 is an enlarged schematic representation of a portion of the trailing edge of the cooled airfoil of FIG. 2 in accordance with an embodiment of the disclosure.

FIG. 4 is an enlarged schematic representation of a portion of the trailing edge 64 of the airfoil 22 as indicated by dashed line 69 in FIG. 3, in accordance with an embodiment of the disclosure. The airfoil 22 includes the plurality of trailing edge bleed slots 72, having defined therebetween land extensions 73. In this particular embodiment, the land extensions 73 are illustrated as substantially linear, or rectangular in geometry, although in alternate embodiments, such as those described below in FIGS. 6 and 7, the land extensions 73 may include alternate configurations. A cooling flow 89 of the cooling fluid 88 may flow through the internal cooling channels 86 and the pin array 90, toward the one or more flow obstruction features 100 and exit the airfoil 22 via the plurality of trailing edge bleed slots 72 so as to cool the airfoil 22. The cooling flow 89 is required to make a turn in order to pass therethrough the pin array 90 toward the plurality of trailing edge bleed slots 72. Other configurations and other components may be used herein.

As illustrated in FIG. 4, the one or more obstruction features 100 are disposed within the at least one internal cooling channel 86, at an upstream end of the plurality of trailing edge bleed slots 72 and proximate the downstream edge 67 (indicated by dashed line) of the pressure side 66. The cooling flow 89 of cooling fluid 88 impinges upon the one or more obstruction features 100 and is distributed toward one or more outer portions 71 of the plurality of trailing edge bleed slots 72, forming a channeled film 81 on the sidewalls 79, thereby cooling a greater portion of each of the plurality of trailing edge bleed slots 72 (described presently). This distribution of the cooling flow 89 toward one or more outer portions 71, and in a general direction of the land extensions 73, solves potential inlet effects on the coolant fluid distribution relative to the plurality of trailing edge bleed slots 72, and more specifically a slot floor 75 of the plurality of trailing edge bleed slots 72.

Figure 5:
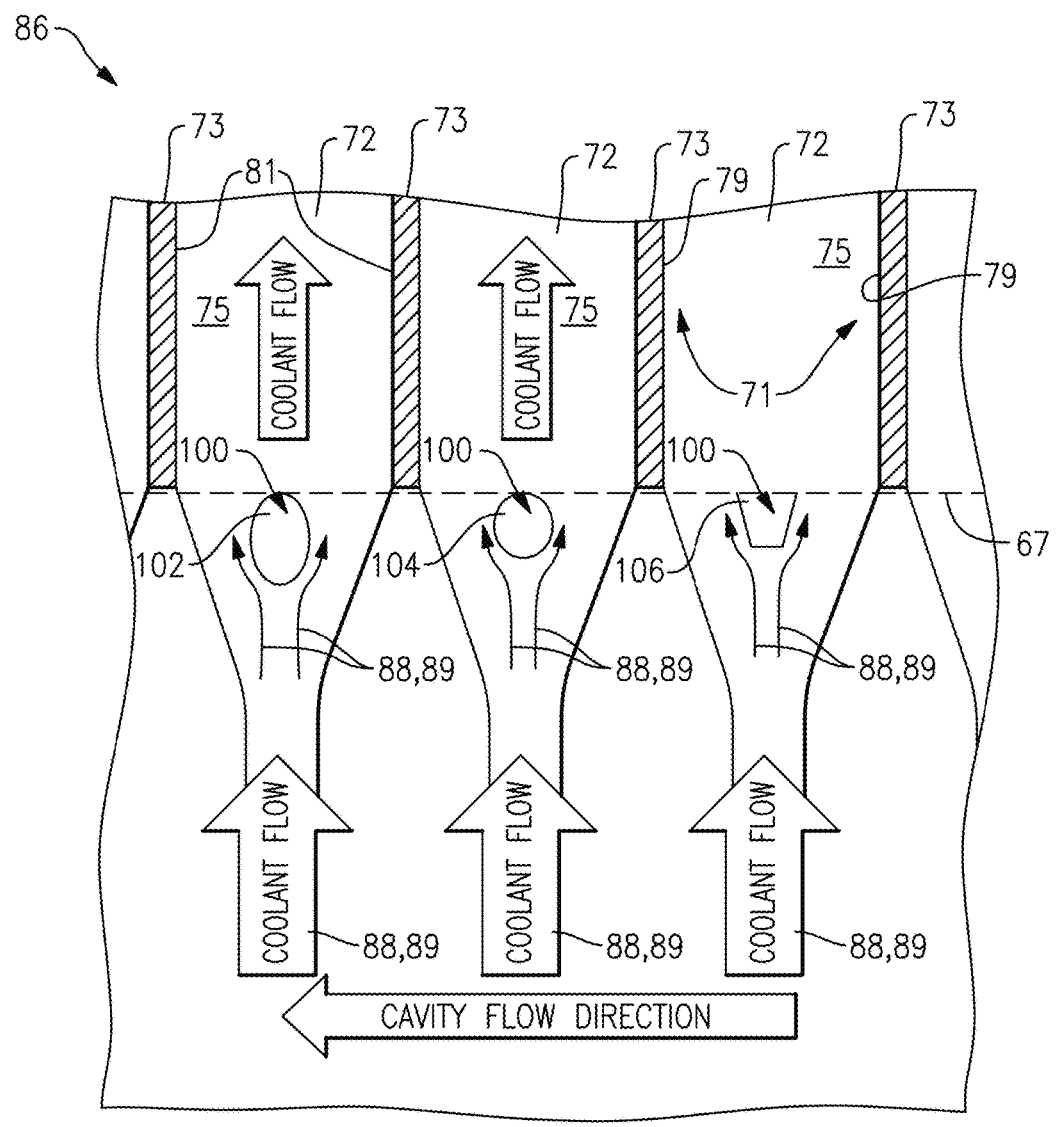
FIG. 5 is a schematic representation of the airfoil trailing edge of FIG. 4 depicting a portion of the at least one cooling channel, the exposed bleed slots and the plurality of obstruction features in accordance with one or more embodiments shown or described herein.
Figure 6:
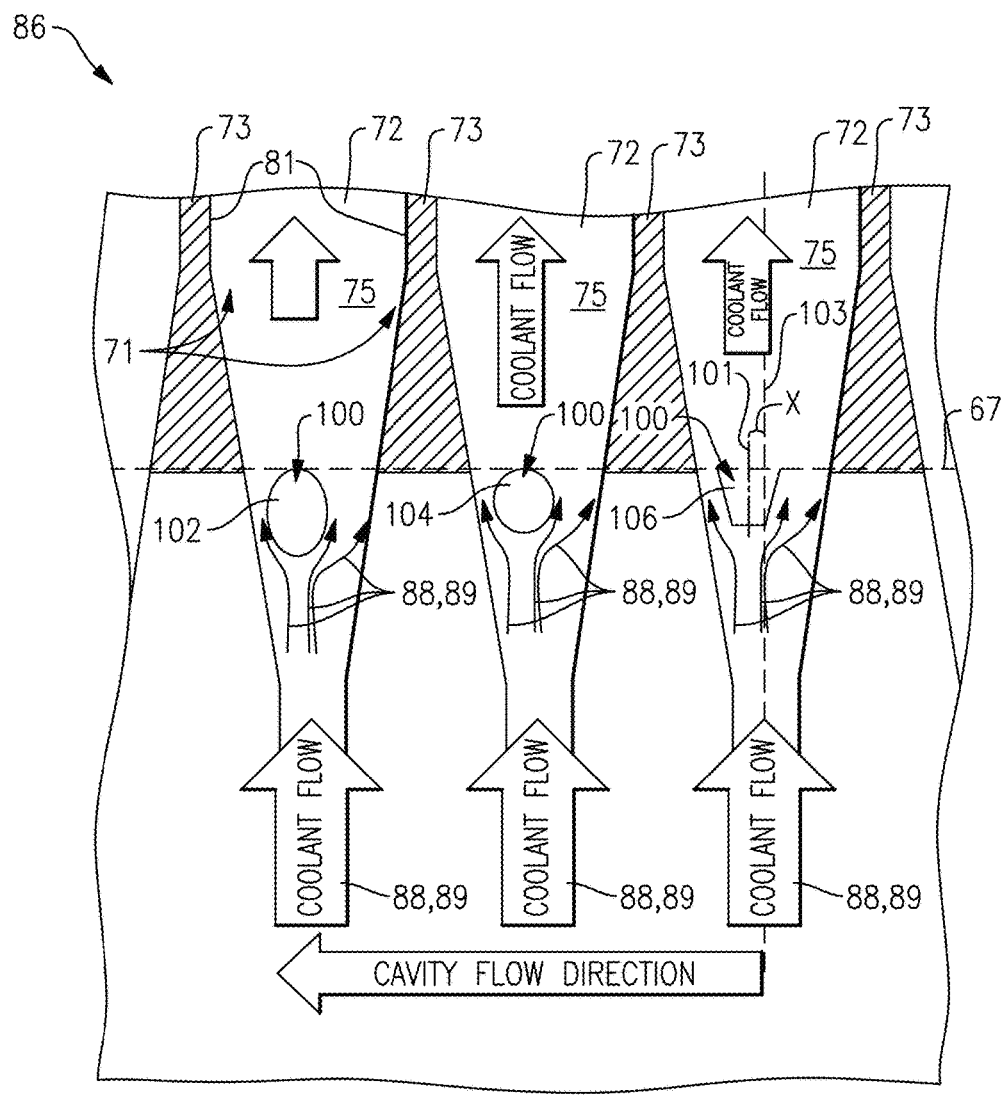
FIG. 6 is a schematic representation of an alternate embodiment of an airfoil trailing edge depicting a portion of the at least one internal cooling channel, the exposed bleed slots and the plurality of obstruction features in a lateral offset position in accordance with one or more embodiments shown or described herein.
Figure 7:
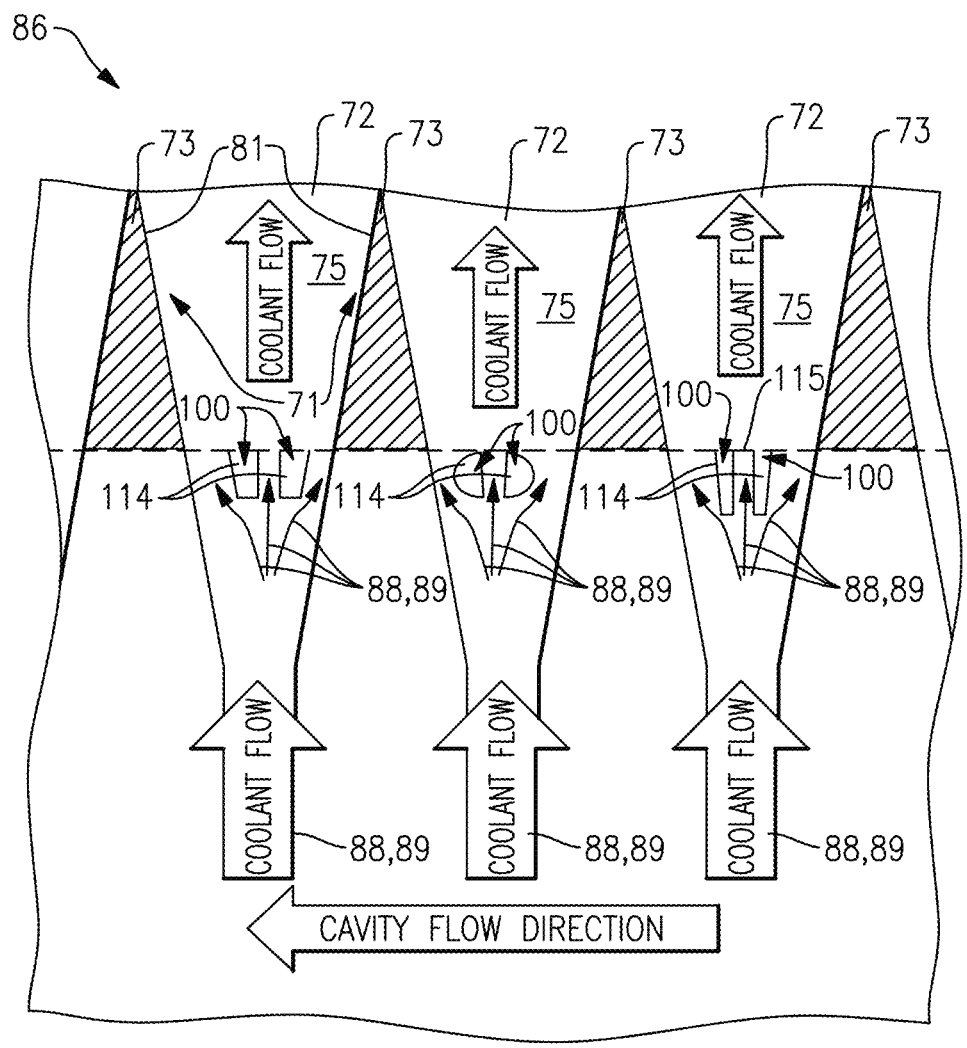
FIG. 7 is a schematic representation of an alternate embodiment of an airfoil trailing edge depicting a portion of the at least one internal cooling channel, the exposed bleed slots and the plurality of obstruction features each configured to include multiple obstruction elements in accordance with one or more embodiments shown or described herein.

Referring now to FIGS. 5-7, illustrated are alternative configurations for the one or more obstruction features 100, as disclosed herein. In addition, the land extensions 73 are illustrated as including alternate configurations. It should be understood that any combination of the disclosed obstruction and land extension configurations is anticipated by this disclosure. In addition, it should be noted that illustrated in FIGS. 5-7, through shading, is the distribution of the cooling fluid 88 as a result of the one or more obstruction features 100.

Referring no more specifically to FIG. 5, illustrated is a schematic representation of a cross-sectional top view of a portion of the at least one internal cooling channel 86, and more specifically the cooling flow 89 as it flows toward the plurality of trailing edge bleed slots 72. In this illustration, three of the plurality of trailing edge bleed slots 72 are shown, having a land extension 73 disposed therebetween and defining the slot floors 75. In this particular embodiment, the land extensions 73 are substantially linear in configuration as previously described with regard to FIGS. 3 and 4. Various flow obstruction features 100 are illustrated as disposed within the at least one internal cooling channel 86, at an upstream end of the plurality of trailing edge bleed slots 72 and proximate the downstream edge 67 (indicated by dashed line) of the pressure side 66. In this particular embodiment, the one or more obstruction features 100 may be configured have a substantially polygon shape, and more particularly configured having a substantially elliptical geometry, a substantially circular geometry or a substantially polygon geometry, such as including rounded edges in light of manufacture tolerances, such as one that mimics the shape of associated trailing edge bleed slots 72. More particularly, the one or more obstruction features 100 may be configured as any of a substantially elliptical obstruction feature 102, a substantially circular obstruction feature 104 or as a substantially polygon shaped obstruction feature 106. In the illustrated embodiment, each of the one or more obstruction features 100 is positioned proximate one of the plurality of trailing edge bleed slots 72 so as to symmetrically distribute the cooling flow 89 about the obstruction feature 100. As illustrated, the cooling flow 89 impinges on the one or more obstruction features 100 and is symmetrically distributed toward the outer portions 71 of each of the of the trailing edge bleed slots 72 to provide improved cooling to the trailing edge 64. The trailing edge bleed slots 72, and also a portion of the internal cooling channels 86 feeding the trailing edge bleed slots 72, may typically be configured to include a diffusion angle. As known in the art, a physical (geometric) diffusion angle of approximately 7 degrees or less to one or both side walls 79 allows the cooling fluid 88 to freely expand and fill the space between without separation of the cooling fluid 88 from one or both side walls 79 defining the trailing edge bleed slot 72. Provision of an obstruction as described herein distributes the cooling fluid 88 preferentially to the outer portions 71 of the trailing edge bleed slots 72, thereby allowing a larger than typical diffusion angle to be employed, such as that illustrated in FIG. 7. Whether this larger diffusion angle is used or not, the direction of the cooling fluid 88 to the outer portions 71 of the trailing edge bleed slots 72 improves the cooling of those regions as well as the adjacent land extensions 73.

FIG. 6 is a schematic representation of a cross-sectional top view of another embodiment of a portion of the at least one internal cooling channel 86 and more specifically the cooling flow 89 as it flows toward the plurality of trailing edge bleed slots 72. Similar to the embodiment of FIG. 5, three of the plurality of trailing edge bleed slots 72 are shown, having a land extension 73 disposed therebetween and defining the slot floors 75. In this particular embodiment, the land extensions 73 are configured to include an angular or tapered upstream portion that extends into a straight downstream portion. Various flow obstruction features 100 are illustrated as disposed within the at least one internal cooling channel 86, at an upstream end of each of the plurality of trailing edge bleed slots 72 and proximate the downstream edge 67 (indicated by dashed line) of the pressure side 66. In this illustrated embodiment, each of the one or more obstruction features 100 is offset laterally, as indicated at "x", relative to each of the plurality of trailing edge bleed slots 72, and more particularly having a center line 101 laterally offset "x" from a center line 103 of the bleed slot 72. As described in the previous embodiment, each of the obstruction features 100 may be configured having a substantially polygon shape, and more particularly configured having a substantially elliptical geometry, a substantially circular geometry or a substantially polygon geometry, such as including rounded edges in light of manufacture tolerances, such as one that mimics the shape of associated trailing edge bleed slots 72. More particularly, each of the one or more obstruction features 100 may be configured as a laterally offset substantially elliptical obstruction feature 108, a laterally offset substantially circular obstruction feature 110 or as a laterally offset substantially polygon shaped obstruction feature 112. The one or more obstruction features 100 are each positioned laterally offset "x" relative to one of the plurality of bleed slots 72 so as to asymmetrically distribute the cooling flow 89. Similar to the previous embodiment, the cooling flow 89 impinges on the one or more obstruction features 100 and is distributed toward the outer portion 71 of each of the cooling slots 72. In contrast to the previous embodiment, the lateral offset "x" of each of the obstruction features 100 relative to the trailing edge bleed slots 72 provides distributing of the cooling flow 89 depending upon the asymmetrical positioning of the feature 100 within the bleed slot 72 to provide improved cooling to the trailing edge 64.

FIG. 7 is a schematic representation of a cross-sectional top view of yet another embodiment of a portion of the at least one internal cooling channels 86 and more specifically the cooling flow 89 as it flows toward the plurality of trailing edge bleed slots 72. Similar to the embodiments of FIGS. 5 and 6, three of the plurality of trailing edge bleed slots 72 are shown, having a land extension 73 disposed therebetween and defining the slot floors 75. In this particular embodiment, the land extensions 73 are configured to include an angular or tapered upstream portion that extending toward the downstream portion. Various flow obstruction features 100 are illustrated as disposed at the downstream edge 67 (shown in dashed line) of the pressure side 66. In the illustrated embodiment, each of the one or more obstruction features 100, is comprised of a plurality of individual obstruction pins 114 configured having a substantially polygon shape, and more particularly configured having a substantially elliptical geometry, a substantially circular geometry or a substantially polygon geometry, such as including rounded edges in light of manufacture tolerances, such as one that mimics the shape of associated trailing edge bleed slots 72. In the illustrated embodiment, each obstruction feature 100 is illustrated as including two obstruction pins, but it is anticipated that each obstruction feature 100 may include any number of obstruction pins so as to provide desired distribution of the cooling flow 89. In the illustrated embodiment, each of the one or more obstruction features 100 may be configured as a multi-element obstruction feature 114, in spaced apart relationship so as to provide for distribution of the cooling flow 90 about the outer portions and therebetween the individual multi-elements that make up the multi-element obstruction feature 114. Similar to the previous embodiment, the cooling flow 89 impinges on the one or more obstruction features 100 and is distributed toward the outer portion 71 of each of the of the cooling slots 72, with a portion of the cooling flow 89 remaining distributed down a central portion 115 of the obstruction features 100. In contrast to the previous embodiment, the multi-element obstruction features 114 provide greater customizing of the distribution of the cooling flow 89 within the bleed slot 72 and improved cooling to the trailing edge 64.

Figure 8:
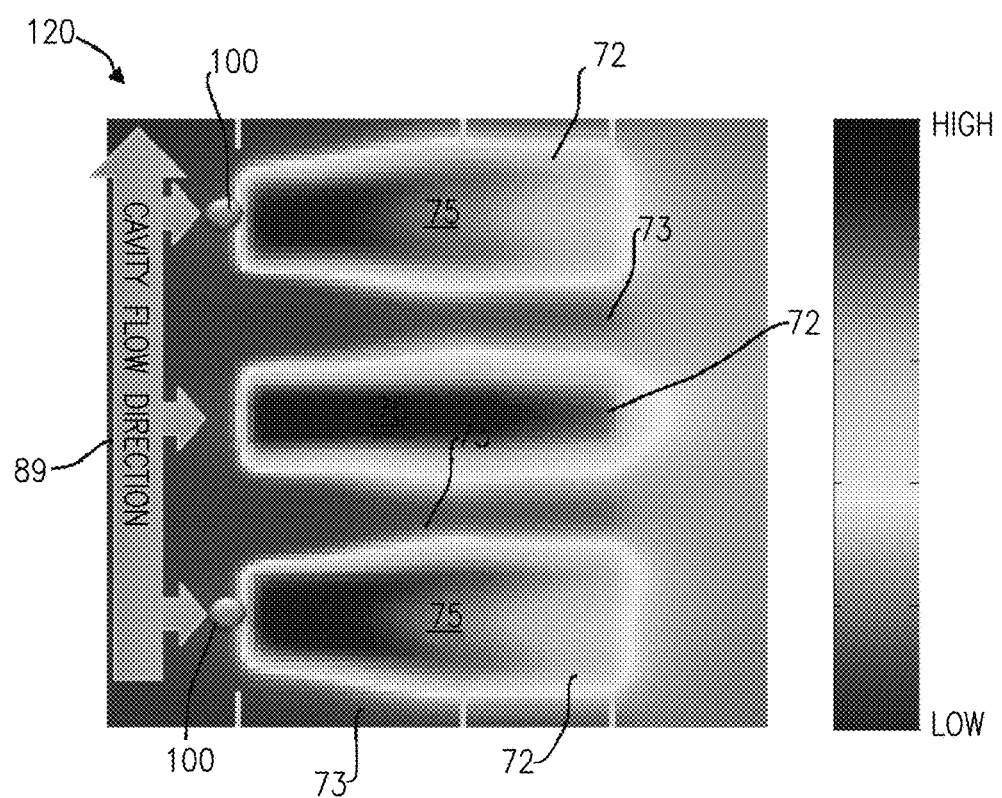
FIG. 8 is a 2D thermal image depicted the cooling effects in a trailing edge of a cooled airfoil in accordance with one or more embodiments shown or described herein.

Turning to FIG. 8, a 2D thermal image 120 is depicted the cooling effects in a trailing edge of an airfoil, such as airfoil 22 of FIGS. 1-7 in accordance with an embodiment disclosed herein. In the present example, the 2D thermal image 120 illustrates three trailing edge bleed slots 72 and their respective slot floors 75 and land extensions 73. As illustrated, two of the illustrated trailing edge bleed slots 72 include obstruction features 100 disposed at an upstream end and in the path of the cooling flow 89. The illustrated center bleed slot 72 does not include an obstruction feature 100 as disclosed herein. Thermal imaging illustrates comparatively that the distribution of the cooling flow 89 via the obstruction features 100 provides an increase in inlet effect on the coolant distribution across bleed slots 72, and more particularly across the slot floors 75. Radial feeding typically induces flow distortion or separation in the trailing edge coolant flows, leading to low film effectiveness and resultant high metal temperatures and short part lifing. The distribution of the cooling flow 89 as disclosed herein provides an increase in cooling area with a decrease in the required cooling flow needed to provide such. As a result, the reduced rate of the coolant flow 89 provides improved SFC, reduced flow distortion or separation induced by the inlet due to radial feeding of the cooling flow, improved land film effectiveness, and improved part lifing by improving film cooling uniformity.

The various embodiments of an airfoil described above provide an airfoil including a trailing edge with improved cooling flow to a trailing edge. The thickness of the trailing edge is reduced to expose the trailing edge bleed slots proximate to the trailing edge. One or more obstruction features are disposed within the at least one internal cooling channel, at an upstream end of the plurality of trailing edge bleed slots and proximate the downstream edge of the pressure side for distributing of the cooling flow. The distribution of the cooling flow forms a channeled cooling fluid film at the trailing edge for cooling the trailing edge during operation and retains the coolant at a surface of the trailing edge while also spreading the coolant over a greater surface area for higher overall cooling efficiency. Thus, the disclosed cooling system and method minimizes flow distortion or separation in the trailing edge coolant flow, while adequately cooling the trailing edge, resulting in an increased efficiency of the airfoil and low maintenance costs of the airfoil.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, various features described, as well as other known equivalents for each feature, may be mixed and matched by one of ordinary skill in this art to construct additional systems and techniques in accordance with principles of this disclosure.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. This written description uses examples to disclose the disclosure, including the best mode, and also to enable any person skilled in the art to practice the disclosure, including making and using any devices or systems and performing any incorporated methods. The representative examples and embodiments provided herein include features that may be combined with one another and with the features of other disclosed embodiments or examples to form additional embodiments that are still within the scope of the present disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An airfoil comprising:
   a leading edge;
   a trailing edge;
   a suction side and a pressure side, wherein a downstream edge of the pressure side lies upstream of a downstream edge of the suction side;
   at least one internal cooling channel defined between the suction side and the pressure side and configured to convey a cooling fluid;
   a plurality of land extensions extending only from the downstream edge of the pressure side to the downstream edge of the suction side;
   a plurality of trailing edge bleed slots defined therebetween the plurality of land extensions and in fluid communication with the at least one internal cooling channel, wherein the plurality of trailing edge bleed slots are exposed proximate to the trailing edge of the airfoil, the at least one cooling channel configured to supply the cooling fluid towards the plurality of trailing edge bleed slots; and
   one or more obstruction features disposed within the at least one internal cooling channel, wherein a furthest downstream edge of the one or more obstruction features is in a same plane as a most upstream edge of the plurality of land extensions, and the plane also coincides with the downstream edge of the pressure sidewall, the one or more obstruction features configured so that a flow of the cooling fluid impinges on an upstream portion of the one or more obstruction features to distribute the flow of the cooling fluid toward radially outer portions of each of the plurality of trailing edge bleed slots and provide distributed cooling to the plurality of trailing edge bleed slots.

2. The airfoil of claim 1, further comprising a pin array positioned within the at least one internal cooling channel to distribute the flow of the cooling fluid towards the trailing edge.

3. The airfoil of claim 1, wherein the one or more obstruction features comprise a predefined substantially polygon shape.

4. The airfoil of claim 1, wherein the one or more obstruction features are configured as substantially elliptical obstruction features.

5. The airfoil of claim 1, wherein the one or more obstruction features are configured as substantially circular obstruction features.

6. The airfoil of claim 3, wherein the one or more obstruction features are disposed laterally offset within the at least one internal cooling channel, relative to the plurality of trailing edge bleed slots, to asymmetrically distribute the flow of the cooling fluid to the plurality of trailing edge bleed slots.

7. The airfoil of claim 3, wherein the one or more obstruction features are disposed centrally within the at least one internal cooling channel, relative to the plurality of trailing edge bleed slots, to symmetrically distribute the flow of the cooling fluid relative to the plurality of trailing edge bleed slots.

8. The airfoil of claim 3, wherein the one or more obstruction features are each configured as a multi-element obstruction feature.

9. The airfoil of claim 1, wherein the airfoil comprises a gas turbine blade airfoil.

10. The airfoil of claim 1, wherein the airfoil comprises a gas turbine vane airfoil.

11. An airfoil comprising:
    a leading edge;
    a trailing edge;
    a suction side and a pressure side, wherein a downstream edge of the pressure side lies upstream of a downstream edge of the suction side;
    at least one internal cooling channel defined between the suction side and the pressure side and configured to convey a cooling fluid;
    a plurality of land extensions extending only from the downstream edge of the pressure side to the downstream edge of the suction side;
    a plurality of trailing edge bleed slots defined therebetween the plurality of land extensions and in fluid communication with the at least one internal cooling channel, wherein
    the plurality of trailing edge bleed slots are exposed proximate to the trailing edge of the airfoil, the at least one cooling channel configured to supply the cooling fluid towards the plurality of trailing edge bleed slots;
    a pin array positioned within the at least one internal cooling channel to distribute the flow of the cooling fluid towards the trailing edge; and
    one or more obstruction features disposed within the at least one internal cooling channel, wherein a furthest downstream edge of the one or more obstruction features is in a same plane as a most upstream edge of the plurality of land extensions, and the plane also coincides with the downstream edge of the pressure sidewall, the one or more obstruction features comprising a predefined shape and configured so that a flow of the cooling fluid impinges on an upstream portion of the one or more obstruction features to distribute the flow of the cooling fluid toward radially outer portions of each of the plurality of trailing edge bleed slots and provide distributed cooling to the plurality of trailing edge bleed slots.

12. The airfoil of claim 11, wherein the one or more obstruction features are configured as substantially elliptical obstruction features, substantially circular obstruction features, substantially polygon shaped features mimicking a shape of one of the plurality of trailing edge bleed slots, or a combination of substantially elliptical obstruction features, substantially circular obstruction features and substantially polygon shaped features.

13. The airfoil of claim 12, wherein the one or more obstruction features are disposed laterally offset within the at least one internal cooling channel, relative to the plurality of trailing edge bleed slots, to asymmetrically distribute the flow of the cooling fluid to the plurality of trailing edge bleed slots.

14. The airfoil of claim 12, wherein the one or more obstruction features are disposed centrally within the at least one internal cooling channel, relative to the plurality of trailing edge bleed slots, to symmetrically distribute the flow of the cooling fluid to the plurality of trailing edge bleed slots.

15. The airfoil of claim 11, wherein the one or more obstruction features are each configured as a multi-element obstruction feature.

16. The airfoil of claim 11, wherein the airfoil comprises one of a gas turbine blade airfoil or a gas turbine vane airfoil.

17. A method of cooling an airfoil comprising a leading edge, a trailing edge, a suction side, a pressure side and at least one internal cooling channel configured to convey a cooling fluid, wherein a downstream edge of the pressure side lies upstream of a downstream edge of the suction side, the method comprising:
supplying the cooling fluid from the at least one internal cooling channel toward a plurality of trailing edge bleed slots in fluid communication with the at least one internal cooling channel, each of the plurality of trailing edge bleed slots defined by a plurality of land extensions extending only from the downstream edge of the pressure side to the downstream edge of the suction side,
wherein the plurality of trailing edge bleed slots are exposed proximate to a trailing edge of the airfoil,
wherein the at least one internal cooling channel includes a plurality of obstruction features disposed within the at least one internal cooling channel, wherein a furthest downstream edge of the one or more obstruction features is in a same plane as a most upstream edge of the plurality of land extensions, and the plane also coincides with the downstream edge of the pressure sidewall, the plurality of obstruction features configured so that a flow of the cooling fluid impinges on an upstream portion of the one or more obstruction features to distribute the flow of the cooling fluid toward radially outer portions of each of the plurality of trailing edge bleed slots; and
distributing the flow of the cooling fluid via the plurality of obstruction features to form a channeled film of the cooling fluid on a plurality of sidewalls of the trailing edge bleed slots for cooling the trailing edge via the plurality of obstruction features.

18. The method of claim 17, wherein the one or more obstruction features are configured as substantially elliptical obstruction features, substantially circular obstruction features, substantially polygon shaped features, laterally offset substantially elliptical obstruction features, laterally offset substantially circular obstruction features, laterally offset substantially polygon shaped features, multi-element obstruction features, or combinations thereof.

19. The method of claim 17, wherein cooling the airfoil comprises cooling a gas turbine blade airfoil.

20. The method of claim 17, wherein cooling the airfoil comprises cooling a gas turbine vane airfoil.

* * * * *